US008816702B2

(12) United States Patent
Tan et al.

(10) Patent No.: US 8,816,702 B2
(45) Date of Patent: Aug. 26, 2014

(54) ULTRAPRECISION NON-CONTACT THREE-DIMENSIONAL PROBING SYSTEM BASED ON SPHERICAL CAPACITIVE PLATE

(75) Inventors: Jiubin Tan, Harbin (CN); Junning Cui, Harbin (CN); Jiwen Cui, Harbin (CN)

(73) Assignee: Harbin Institute of Technology, Harbin (CN)

( * ) Notice: Subject to any disclaimer, the term of this patent is extended or adjusted under 35 U.S.C. 154(b) by 366 days.

(21) Appl. No.: 13/128,518

(22) PCT Filed: Jan. 18, 2010

(86) PCT No.: PCT/CN2010/070235
§ 371 (c)(1),
(2), (4) Date: Sep. 6, 2011

(87) PCT Pub. No.: WO2010/139198
PCT Pub. Date: Dec. 9, 2010

(65) Prior Publication Data
US 2012/0062246 A1    Mar. 15, 2012

(30) Foreign Application Priority Data
May 31, 2009   (CN) .......................... 2009 1 0072143

(51) Int. Cl.
*G01R 27/26*   (2006.01)
*G01B 7/012*   (2006.01)
(52) U.S. Cl.
CPC ..................................... *G01B 7/012* (2013.01)
USPC ........................................................ 324/662

(58) Field of Classification Search
USPC ............ 324/662, 686–688, 690; 33/503, 504, 33/559–573
See application file for complete search history.

(56) References Cited

U.S. PATENT DOCUMENTS

| 4,059,797 A | * | 11/1977 | Gay ............................... 324/680 |
| 4,176,555 A | * | 12/1979 | Dorman .......................... 73/658 |
| 4,806,848 A | * | 2/1989 | Demers .......................... 324/662 |
| 5,166,679 A | * | 11/1992 | Vranish et al. ........... 340/870.37 |
| 5,315,259 A | * | 5/1994 | Jostlein ......................... 324/690 |
| 5,517,124 A | * | 5/1996 | Rhoades et al. .............. 324/662 |
| 5,517,190 A | * | 5/1996 | Gunn ....................... 340/870.18 |
| 6,331,780 B1 | * | 12/2001 | Hiroshima et al. ........... 324/684 |

* cited by examiner

*Primary Examiner* — Melissa Koval
*Assistant Examiner* — Daniel Miller
(74) *Attorney, Agent, or Firm* — Troutman Sanders LLP; Ryan A. Schneider; Benjamin C. Wiles

(57) ABSTRACT

A non-contact three-dimensional probing system based on a spherical capacitive plate has a probe including a spherical probing head (5), a stylus pipe (6), an active shielding pipe (8), a signal conducting rod (7), an insulating element (9), a stylus holder (10) and a probe body (11). The spherical probing head (5) is mounted at one end of the insulating element (9), and it has a spherical capacitive plate over its surface. The capacitive signal coming from the spherical capacitive plate is outputted through the signal conducting rod (7). The active shielding pipe (8) is driven by the signal converting and processing circuit (13) of the probing system to maintain equipotential with the signal conducting rod (7), and so the influence of parasitic capacitance and spatial electromagnetic interference can be eliminated.

12 Claims, 4 Drawing Sheets

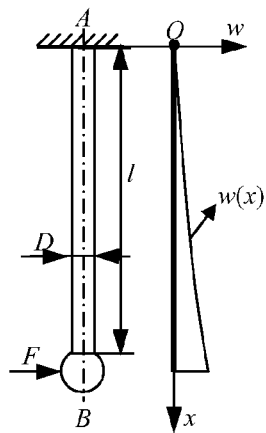
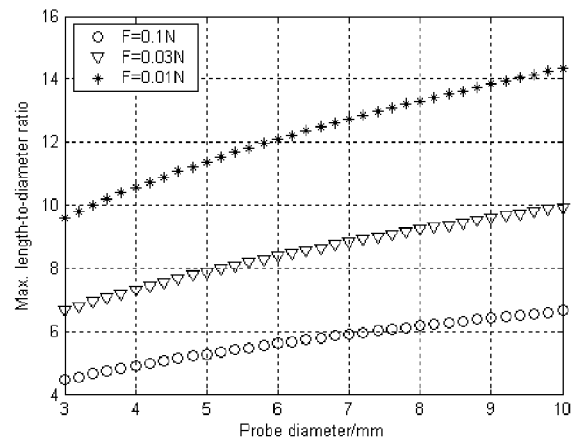
Fig. 1a    Fig. 1b
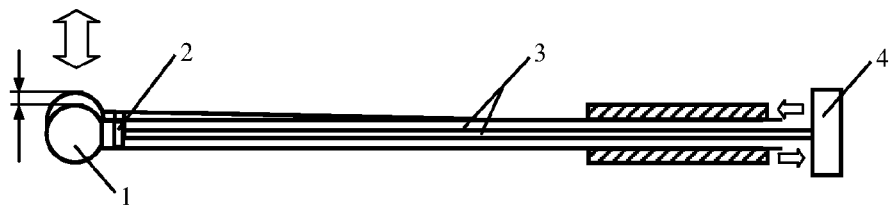
Fig. 2
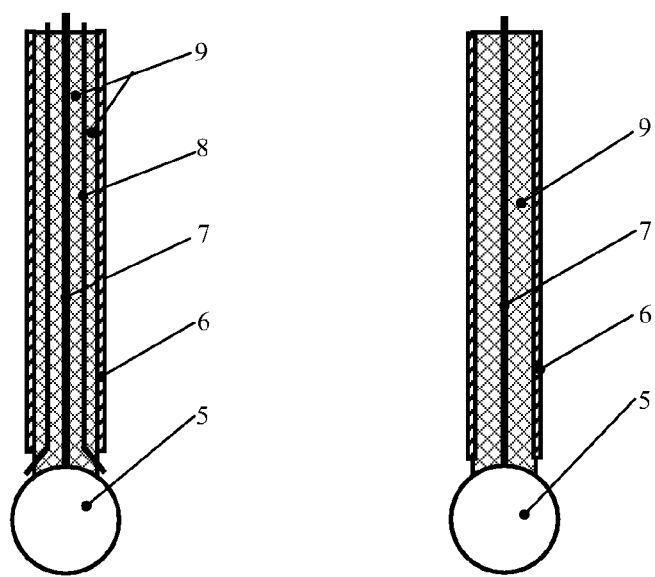
Fig. 6    Fig. 7

US 8,816,702 B2

ULTRAPRECISION NON-CONTACT THREE-DIMENSIONAL PROBING SYSTEM BASED ON SPHERICAL CAPACITIVE PLATE

BENEFIT CLAIMS

This application is a US National Stage of International Application No. PCT/CN2010/070235, filed 18 Jan. 2010, which claims the benefit of CN 2009100772143.2, filed 31 May 2009, both herein fully incorporated by reference.

FIELD OF INVENTION

The present invention relates to an ultraprecision non-contact three-dimensional probing system based on a spherical capacitive plate, which can be used for measurement of small structures with large aspect ratio on a coordinate measuring machine (CMM), a diameter measuring machine, or other measuring machines.

DESCRIPTION OF PRIOR ART

Coordinate measuring machines have been widely used for measurement of complicated geometrical dimensions immediately after their appearance in late 50's of the 20th century. With more and more small structures with large aspect ratio, such as holes with diameters in the range of 1~20 mm and aspect ratios larger than 10 are used in aviation, aerospace and automotive industries in recent years, which present challenges to the measurement precision and measurable depth of existing probing systems, it has become increasingly important to develop a precise three-dimensional probing system for a CMM, especially for one with submicron precision.

And so, many measuring instrument manufactures are trying hard to design and develop non-contact probing systems, especially optical probes in recent years. However, the sensing characteristics of not only the traditional "magic eye", but also a variety of newly developed optical probes can be easily influenced by the material characteristics and surface finish of the part being measured. High resolution can be obtained with some optical probes such as a confocal probe, but it is very difficult to develop a stylus with large aspect ratio. The general development trend of non-contact probing techniques at present is to develop 2D optical probes for rapid low precision scanning measurement of external profile and shape.

With long styli or extension rods, contact probing systems can go deep into parts. A contact probe usually consists of a probing head, a stylus, a sensing unit, a stylus holder and a probe body. According to the operating mode of the sensing unit, a contact probe can be a touch trigger probe or a scanning probe.

The following is the operating principle of a touch trigger probe: a trigger signal is output when the probing head touches the part being measured, and the coordinates of the contact point can be then calculated using the coordinate signals of a CMM. A touch trigger probe is simple in structure, low in cost, and no complicated signal converting and processing circuit is needed. However, it has the following shortcomings: 1) the stylus bending caused by probing force seriously reduces the measurement precision; a solid state sensing probes can be more sensitive, but its probing force is hardly below 0.01N and it tends to give a false trigger for it is more sensitive to interference and noise too; 2) there is a pretravel from the position where the probing head touches the part being measured to the position where the trigger signal is output; 3) there is difference between the probing force and the pretravel in different directions, namely the probing characteristic is anisotropic, which is the main source of repeatability errors.

For a scanning probe, the micro displacement of the probing head rather than a trigger signal is the output when its probing head contacts a part being measured, which is different from a touch trigger probe. The core of a three-dimensional scanning probe is a micro three-dimensional carriage with high sensitivity and linearity. A scanning probe has a lower probing force and a higher precision, and a submicron precision can be obtained with a precise inductive three-dimensional probe. However, when it's applied for measurement of a small structure with large aspect ratio, such as a deep small hole, 1) the probing force is hardly below 0.01N. As shown in FIG. 1a, the probe stylus bends under the effect of the probing force, and this stylus bending limits the measurement precision and measurable depth. Assuming the maximum permissible stylus bending is 50 nm and the elastic modulus of stylus material is 200 Gpa, according to the simulation results shown in FIG. 1b, maximum aspect ratio of a contact probe stylus can not exceed 10:1; 2) a 1D scanning probe is simple in structure, and both higher resolution and precision can be obtained, but a three-dimensional probe is much more complicated in structure and its precision is much lower.

In a contact probe now available, the probing head which probes the part being measured is at the far end of the stylus, while the sensing unit which converts the displacement being measured to an electrical signal is in the probe body. And when the stylus is longer, the stylus bending caused by probing force and kinematics inertia is more serious. To solve this problem, a new technique named "Tip Sensing" is presented by Renishaw at 2006 (International patent publication No. WO 2006/114627 A1). As shown in FIG. 2, micro reflector 2 is mounted at or near probing head 1; laser source and PSD 4 are mounted in the probe body. Laser beam 3 passes down along the hollow stylus, and it's then reflected from micro reflector 2 and returns to the PSD. The accurate position of the probing head is thus sensed and the stylus bending can be compensated. The "Tip Sensing" technique is a revolutionary progress in precision probing technology. However, it still has several shortcomings to be overcome: 1) the PSD is sensitive to the stylus bending only in two dimensions; 2) the contact deformation of the probing head and the part being measured that is caused by probing force can not be compensated; 3) when the stylus is longer, the compensation result will be worse. And so the stylus deformation due to probing force and kinematics inertia still limits further improvement in measurement precision and measurable depth.

SUMMARY OF INVENTION

In order to solve the shortcomings and contradiction between precision and measurable depth in existing probing systems, the present invention provides a probing system whose stylus can be very long, and three-dimensional size and profile of small structures with large aspect ratio can be measured in a non-contact way with ultrahigh resolution.

The present invention provides an ultraprecision non-contact three-dimensional probing system based on spherical capacitive plate, which comprises a probe and a signal converting and processing circuit; the probe comprises a spherical probing head, a stylus pipe, an active shielding pipe, a signal conducting rod, an insulating element, a stylus holder and a probe body; the signal conducting rod is fitted inside the active shielding pipe which is fitted inside the stylus pipe; the signal conducting rod and the active shielding pipe, the active shielding pipe and the stylus pipe are insulated against each other by the insulating element; the stylus pipe is fitted on the stylus holder which is fitted on the probe body; the spherical probing head, having a spherical capacitive plate over its surface, is mounted at one end of the insulating element; the spherical capacitive plate is insulated against the active shielding pipe and the stylus pipe, and is electrically connected to one end of the signal conducting rod; driven by an equipotential driving circuit in the signal converting and processing circuit, the active shielding pipe is equipotential with the signal conducting rod, while the stylus pipe is earthed.

Preferably the stylus holder comprises a locking screw, a pressing pad and a conical locking sleeve; the conical locking sleeve is slid over the stylus pipe and fitted inside the probe body, and it has a slot in its sidewall and decompressing grooves uniformly arrayed with the slot; the locking screw is fitted inside the probe body through screw thread; the pressing pad made of elastic material is located between the conical locking sleeve and the locking screw.

The spherical probing head is made by machining a ball with conductive metal or conductive alloy, or by coating conductive film over a dielectric sphere.

Preferably the active shielding pipe is bell-mouthed at one end which is close to the spherical probing head.

The signal conducting rod can be fitted inside the stylus pipe and is insulated against the stylus pipe by the insulating element.

The spherical probing head and the signal conducting rod are interconnected by welding or mechanical fixing.

The signal converting and processing circuit and the probe can be connected via a tri-coaxial cable; the outer shield layer, the inner shield layer and the core wire of the tri-coaxial cable are connected to the stylus pipe, the active shielding pipe and the signal conducting rod of the probe respectively.

The whole or the front end circuit of signal converting and processing circuit can be fitted inside the probe body.

The signal converting and processing circuit can be an operational amplifying circuit or an AC bridge circuit.

The present invention has the following advantages:

(1) Measurability of small structures with large aspect ratio in a non-contact way. With a spherical capacitive plate with identical sensing characteristic in any arbitrary spatial direction is used as the sensing unit, small structures with large aspect ratio can be measured in a non-contact way without stylus bending or contact deformation of probe head and part being measured in contact probing systems.

(2) Outstanding dynamic performance during scanning measurement. There is no three-dimensional micro-carriage structure or any other kinematic mechanism needed in the probe, dynamic error caused by kinematic inertia can thus be eliminated. And also both the stylus and the probe are very light in weight, so an outstanding dynamic performance can be obtained.

(3) Approximate point sensing characteristics. Because most electric lines of force of a spherical capacitive plate concentrate within a very small reign between the plate and the part being measured, so the present invention has approximate point sensing characteristics and can be used for very small structure probing.

BRIEF DESCRIPTION OF ACCOMPANYING DRAWINGS

FIG. 1a is a schematic illustration of the stylus bending of a contact probe under effect of a probing force.

FIG. 1b is a simulation result of the maximum aspect ratio for a contact probe stylus.

FIG. 2 is a schematic illustration of the existing "Tip sensing" technique.

FIG. 5b is a top view of the conical locking sleeve in the stylus holder.

FIG. 5c is the A-A cross-sectional view of FIG. 5a.

FIG. 6 is the bell mouth structure of the active shielding pipe.

FIG. 7 is the structure of a probe in which signal conducting rod is fitted inside the stylus pipe.

Figure 9A:
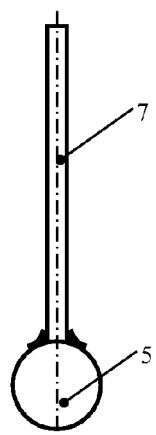

FIG. 9a: is one connection method of the signal conducting rod and the spherical probing head.

Figure 9B:
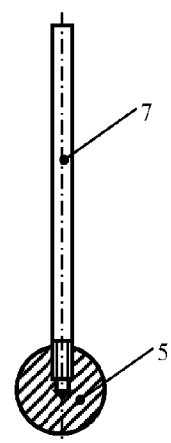

FIG. 9b is another connection method of the signal conducting rod and the spherical probing head.

Figure 10:
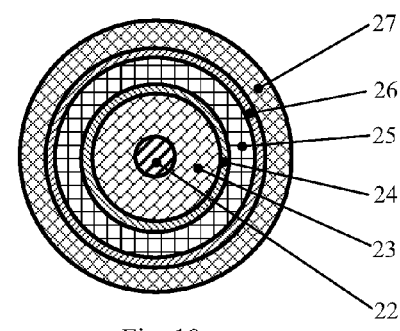

FIG. 10 is a cross-sectional view of a tri-coaxial cable.

Figure 11:
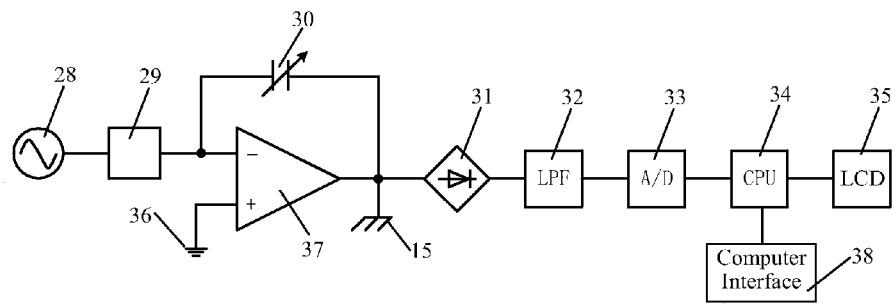

FIG. 11 is a block diagram illustrating one embodiment of the signal converting and processing circuit.

Figure 12:
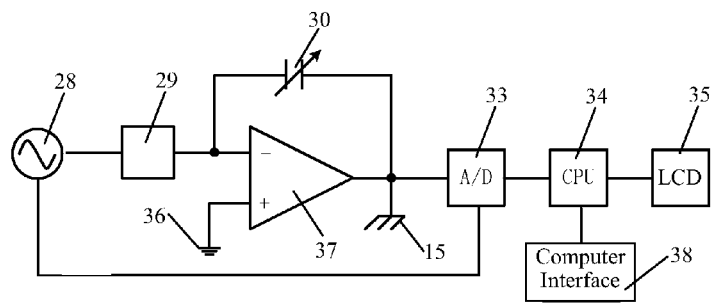

FIG. 12 is a block diagram illustrating another embodiment of the signal converting and processing circuit.

Figure 13A:
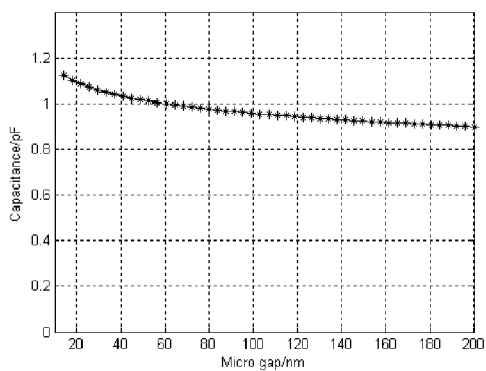

FIG. 13a is a simulation result of capacitance vs. micro gap.

Figure 13B:
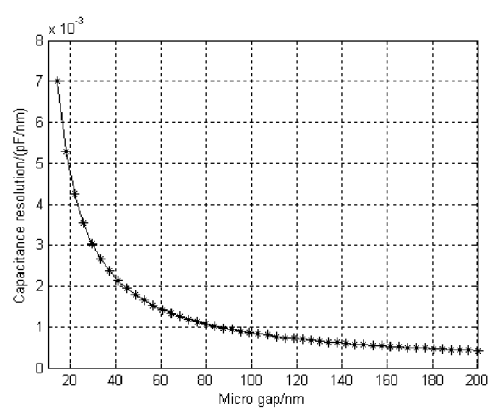

FIG. 13b is a simulation result of resolution vs. micro gap.

DESCRIPTION OF PREFERRED EMBODIMENTS

Preferred embodiments of the present invention will be described in detail with reference to the accompanying drawings.

Figure 3:
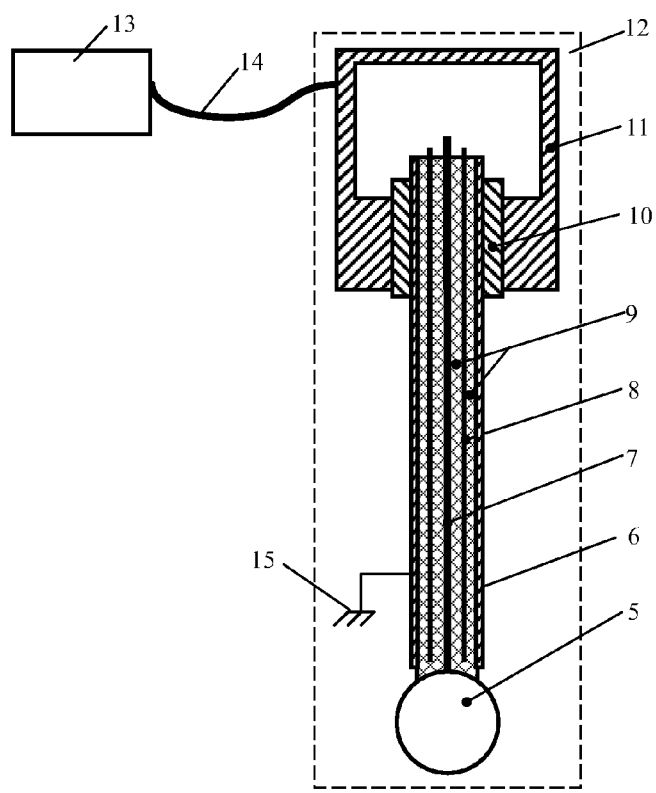
FIG. 3 is a schematic diagram of an ultraprecision non-contact three-dimensional probing system based on a spherical capacitive plate.

As shown in FIG. 3, an ultraprecision non-contact three-dimensional probing system based on spherical capacitive plate comprises a probe 12 and a signal converting and processing circuit 13; the probe 12 comprises a spherical probing head 5, a stylus pipe 6, an active shielding pipe 8, a signal conducting rod 7, an insulating element 9, a stylus holder 10 and a probe body 11; the signal conducting rod 7 is fitted inside the active shielding pipe 8 which is fitted inside the stylus pipe 6; the signal conducting rod 7 and the active shielding pipe 8, the active shielding pipe 8 and the stylus pipe 6 are insulated against each other with the insulating element 9; the stylus pipe 6 is fitted on the stylus holder 10 which is fitted on the probe body 11; the spherical probing head 5, having a spherical capacitive plate over its surface, is mounted at one end of the insulating element 9; the spherical capacitive plate is insulated against the active shielding pipe 8 and the stylus pipe 6, and is electrically connected to one end of the signal conducting rod 7; driven by an equipotential driving circuit in the signal converting and processing circuit 13, the active shielding pipe 8 is equipotential with the signal conducting rod 7, while the stylus pipe 6 is earthed. In the present invention the spherical capacitive plate is used as a sensing unit for converting the micro gap between the spherical probing head 5 and the part being measured to a capacitive signal through the electric field formed between them. Therefore, displacement, geometry and three-dimensional coordinates of the part can be measured in a non-contact way with high resolution. The stylus pipe 6, the active shielding pipe 8 and the signal conducting rod 7 altogether form a tri-coaxial structure, and the influence of parasitic capacitance and spatial electromagnetic interference on the capacitive signal can be completely eliminated.

Preferably, the stylus holder 10 comprises a locking screw 18, a pressing pad 17 and a conical locking sleeve 16; the conical locking sleeve 16 is slid over the stylus pipe 6 and is fitted inside the probe body 11, and the conical locking sleeve 16 has a plurality number of decompressing grooves 20 and a slot 19 formed in its sidewall with equal angle intervals; the locking screw 18 is fitted inside the probe body 11 by means of screw thread; the pressing pad 17, which is made of elastic material, is located between the conical locking sleeve 16 and the locking screw 18. The decompressing grooves 20 are formed aiming at decreasing the locking force through removing material. The locking screw 18 can bring pressure on the conical locking sleeve 16 through the pressing pad 17, and in turn shrink the slot 19 to lock the stylus pipe 6.

The spherical probing head 5 is made by machining a ball of conductive metal or alloy, or by coating conductive film over a dielectric sphere.

Preferably the active shielding pipe 8 is bell-mouthed at one end which is close to the spherical probing head 5 to the insulate stylus pipe 6 against the spherical probing head 5 and further to decrease the parasitic capacitance between the spherical capacitive plate and earth.

The signal conducting rod 7 can be fitted inside the stylus pipe 6 in a matter that they are insulated against each other by the insulating element 9.

The spherical probing head 5 and the signal conducting rod 7 are interconnected by welding or mechanical fixing.

The signal converting and processing circuit 13 and the probe 12 can be connected via a tri-coaxial cable 14; the outer shield layer 26, the inner shield layer 24 and the core wire 22 of the tri-coaxial cable 14 are connected to the stylus pipe 6, the active shielding pipe 8 and the signal conducting rod 7 of the probe 12 respectively.

The whole or the front end circuit of the signal converting and processing circuit 13 can be fitted directly inside the probe body 11.

The signal converting and processing circuit 13 can be an operational amplifying circuit or an AC bridge circuit.

Analysis and a preferred embodiment are provided with reference to FIG. 3. In the present invention, the spherical capacitive plate is over the surface of the spherical probing head 5, and the part being measured is earthed. The spherical capacitive plate does not contact the part being measured during the measuring process and there is a micro gap between them. Assuming the micro gap is g and the capacitance between the spherical capacitive plate and the part being measured is C, capacitance C vs. micro gap g is the sensing characteristic of the spherical capacitive plate. Because the electric field between the spherical capacitive plate and the part being measured is spatially non-uniform, it's difficult to calculate the value of C by directly solving the electromagnetic field equations. So the value of C is calculated with electric image method (EIM) here. Assuming the radius of the spherical capacitive plate is $R_0$, the distance between the sphere center and the surface of the part being measured is D, then $D=R_0+g$. Assuming charge $+q_1$ is put at the sphere center of the spherical capacitive plate, the image charges which are successively generated are $q_2, q_3, q_4, \ldots$, and the distance between charges and the sphere center is $l_1, l_2, l_3, l_4, \ldots$ respectively, then:

$$l_1 = 0 \tag{1}$$

$$l_n = \frac{R_0^2}{2D - l_{n-1}} \tag{2}$$

$$q_n = \frac{R_0}{2D - l_{n-1}} q_{n-1} \tag{3}$$

Assuming the potential of the spherical capacitive plate is $\varphi$, then $\varphi$ is determined only by $+q_1$:

$$\varphi = \frac{q_1}{4\pi\varepsilon R_0} \tag{4}$$

where $\varepsilon$ is dielectric constant of air. The capacitance between the spherical capacitive plate and the infinite earthed conductive plate is:

$$C = \frac{q}{\varphi} = \frac{\sum_{n=1}^{\infty} q_n}{\varphi} = 4\pi\varepsilon R_0 \tag{5}$$

$$\left(1 + r + \frac{r^2}{1-r^2} + \frac{r^3}{1-2r^2} + \frac{r^4}{1-3r^2+r^4} + \frac{r^5}{1-4r^2+3r^4} + \cdots\right)$$

where $r=R_0/2D$.

In this embodiment, the diameter of the spherical probing head 5 can be 3 mm, the micro gap between the probing head and the part being measured is 10~200 nm. Simulation results of its capacitance vs. micro gap and capacitive resolution vs. micro gap characteristics are shown in FIGS. 13a and 13b respectively. The spherical probing head 5 is made of a high grade stainless steel ball, the surface of which forms the spherical capacitive plate. The diameter variation and the spherical shape error of the high grade steel ball can be less than 0.05 μm, and its surface roughness can be less than 5 nm. The stylus pipe 6 and the active shielding pipe 8 are made of thin-walled stainless steel pipes. The stylus pipe 6 is 2.5 mm in diameter and 0.2 mm in wall thickness, while the active shielding pipe 8 is 1.5 mm in diameter and 20 μm in wall thickness, and the straightness of both should be better than 20 μm/100 mm. The signal conducting rod 7 can be made of a nickel wire of 0.2 mm in diameter, with one end welded to the spherical probing head 5 by resistance welding. The stylus pipe 6, the active shielding pipe 8 and the signal conducting rod 7 are coaxially assembled, so as to form a tri-coaxial structure. The insulating element 9 can be made of Teflon material, and is glued together with the signal conducting rod 7, the active shielding pipe 8 and the stylus pipe 6 by epoxy resin. An alternative method is to inject epoxy resin into the stylus pipe 6 and the active shielding pipe 8, and then solidify the epoxy resin to form the insulating element 9. The stylus pipe 6 is mounted on the stylus holder 10 which is screwed onto the probe body 11.

The stylus pipe 6 is earthed so as to shield against spatial electromagnetic interference. When a human being or an object moves around, there will be no change in capacitance between the probe and earth, and therefore no external interference will be introduced. Driven by an equipotential driving circuit in the signal converting and processing circuit 13, the active shielding pipe 8 is equipotential with the signal conducting rod 7, so that the parasitic capacitance between them is eliminated. Parasitic capacitance between the active shielding pipe 8 and the stylus pipe 6 becomes a load of the equipotential driving circuit, and so there is no influence on the sensitivity and resolution of the probing system. The equipotential driving circuit can be a high precision 1:1 amplifying circuit, in which a high precision operational amplifier OP177A can be used.

In this embodiment the signal converting and processing circuit 13 and the probe 12 are interconnected via the tri-coaxial cable 14. As shown in FIG. 10, the tri-coaxial cable 14 consists of an outer sheath 27, an outer shielding layer 26, an inner sheath 25, an inner shielding layer 24, an insulating layer 23 and a core wire 22. The outer shielding layer 26, the inner shielding layer 24 and the core wire 22 of the tri-coaxial cable 14 are connected to the stylus pipe 6, the active shielding pipe 8 and the signal conducting rod 7 of the probe 12 respectively. Under the effect of the equipotential driving circuit in the signal converting and processing circuit 13, the influence of cable capacitance between the inner shielding layer 24 and the core wire 22 can be eliminated. To further improve performance of the present invention, an alternative way is to dispose the whole or the front end circuit of the signal converting and processing circuit 13 inside the probe body 11. The influence of parasitic capacitance and cable capacitance can be further decreased, and the sensitivity and resolution performance of the probing system can therefore be improved.

Figure 4:
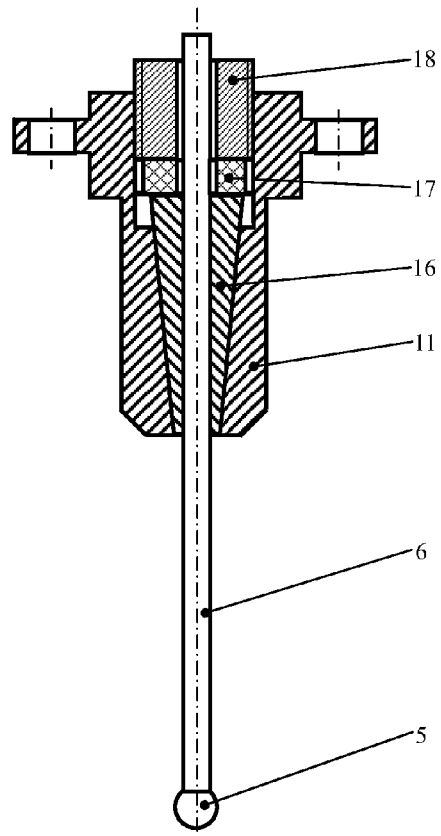
FIG. 4 is a cross-sectional view of the stylus holder.

The stylus pipe 6 can be easily deformed by improper mounting because it is made of thin-walled metal pipe, so it is important to design a safe and reliable stylus mounting mechanism. As shown in FIG. 4, the stylus holder 10 comprises the locking screw 18, the pressing pad 17 and the conical locking sleeve 16. The conical locking sleeve 16 is slid over the stylus pipe 6 and fitted inside the probe body 11, and it has the slot 19 in its sidewall. The pressing pad 17 is made of elastic material such as nylon or Teflon. The locking screw 18 is fitted with the probe body 11 through screw thread, and it brings pressure on the conical locking sleeve 16 through the pressing pad 17 to make the slot 19 shrink and lock the stylus pipe 6.

Figure 5A:
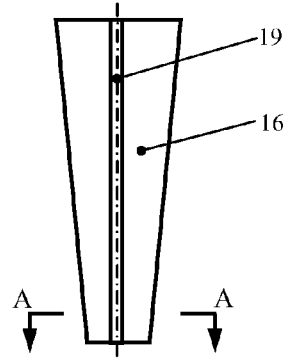
FIG. 5a is a side view of the conical locking sleeve in the stylus holder.
Figures 5B, 5C:
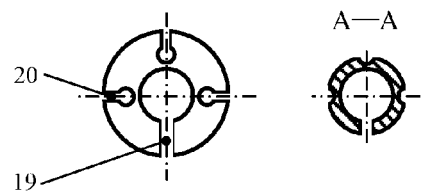

As shown in FIGS. 5a, 5b and 5c, the inner surface of the conical locking sleeve 16 is cylindrical while its outer surface is conical. The slot 19 is in the sidewall of the conical locking sleeve 16 and decompressing grooves 20 are uniformly arrayed with the slot 19. The function of the decompressing grooves is to decrease locking pressure by decreasing the wall thickness of the conical locking sleeve 16. If there are two decompressing grooves they are 120° uniformly arrayed with the slot 19, if there are three decompressing grooves they are 90° uniformly arrayed with the slot 19, and so forth.

As shown in FIG. 6, the active shielding pipe 8 is bell-mounted at one end which is close to the spherical probing head 5, and so the stylus pipe 6 and the spherical probing head 5 can be further separated and therefore the parasitic capacitance between the spherical capacitive plate and earth can be further decreased.

As shown in FIG. 7, an alternative configuration of the probe structure is that the signal conducting rod 7 is fitted inside the stylus pipe 6 without active shielding pipe 8. The signal conducting rod 7 and the stylus pipe 6 are insulated against each other by the insulating element 9. In this configuration parasitic capacitance between the signal conducting rod 7 and the stylus pipe 6 and its variation may influence the sensitivity and resolution of the probing system. In order to reduce said parasitic capacitance and its variation, according to the capacitance equation for cylindrical capacitors, the ratio of the inner diameter of the stylus pipe 6 to the outer diameter of the signal conducting rod 7 should be as large as possible, and the stylus pipe 6 and the signal conducting rod 7 should be made of material with low temperature coefficient, such as invar.

Figure 8A:
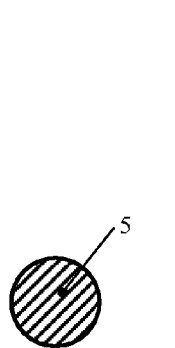
FIG. 8a is one embodiment of the spherical probing head.
Figure 8B:
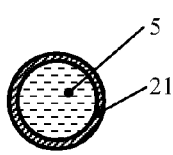
FIG. 8b is another embodiment of the spherical probing head.

As shown in FIG. 8a, the spherical probing head 5 is made of conductive metal or conductive alloy, whose surface forms the spherical capacitive plate. The spherical probing head 5 can be manufactured using an alternative method. As shown in FIG. 8b, a high precision sphere is made of hard dielectric material such as ruby, and a conductive film 21 is coated on its surface thereof to form the spherical capacitive plate.

The signal conducting rod 7 and the spherical probing head 5 can be connected in two ways. In one way, as shown in FIG. 9a, the signal conducting rod 7 and the spherical probing head 5 are welded together; and in another way, as shown in FIG. 9b, they can also be interconnected by screw thread which is a form of mechanical fixing. This method is applicable to the situation when the spherical probing head 5 is a sphere made of conductive metal or conductive alloy and the diameter of the signal conducting rod 7 is over 1 mm in diameter.

One embodiment of the signal converting and processing circuit 13 is illustrated in FIG. 11, in which an operational amplifying circuit is used. As shown in FIG. 11, the operational amplifying circuit comprises a sinusoidal signal source 28, a reference capacitance 29, a main amplifier 37, capacitance being measured 30, an absolute value circuit 31, a low pass filter 32, an A/D converter 33, a microprocessor 34, a display unit 35 and a computer interface 38. The sinusoidal signal source 28 provides a sinusoidal carrier signal with high amplitude and high frequency stability. In this embodiment the sinusoidal signal source 28 is designed by direct digital synthesizing (DDS) and a high performance DDS chip AD9953 from Analog Devices is used. The stability of the reference capacitor 29 directly determines the precision of the signal converting and processing circuit 13. A precise capacitor with zero temperature coefficient is used in this embodiment, whose relative stability is up to 1~10 ppm after additional temperature compensation technique is used. The capacitance being measured 30 is the capacitance between the spherical capacitive plate and the part being measured. The main amplifier 37 should be a high precision operational amplifier with high input impedance, low input offset voltage, input offset current and input bias current. An AD549K from Analog Devices with differential input impedance up to $10^{13}\Omega$ and common mode input impedance up to $10^{15}\Omega$ is used is this embodiment. After the sinusoidal carrier signal passes the main amplifier 37, the amplitude of the output signal is inverse proportional to the capacitance being measured 30, when the input offset voltage and input offset current of the main amplifier 37 is ignored. As a result the amplitude of the carrier signal is modulated by the signal being measured to an amplitude modulated (AM) signal. The part being measured is earthed, while the reference ground of the signal converting and processing circuit 13 is a sensor ground 36. The earth 15 and the sensor ground 36 are electrically insulated. The AM signal is then full wave rectified and low pass filtered, and a DC signal whose amplitude is proportional to the amplitude of the AM signal is obtained, high precision demodulation of the AM signal is thus realized. In this embodiment full wave rectification is implemented by the absolute value circuit 31, and the low pass filter 32 is an eight order Chebyshev filter with cutoff frequency of 2 kHz. An AD976A with 16 bits resolution and 200 ksps sampling rate from Analog Devices is used as the A/D converter 34, a TMS320LF2407A from Texas Instruments is used as the microprocessor 34, a LCD module MS12864A is used as the display unit 35 and a USB2.0 high speed data transmission module is used as the computer interface 32.

Under the control of the microprocessor 34, the DC analog signal that is output from low pass filter 32 is continually sampled by the A/D converter 33 and the sampling results are sent to the microprocessor 34. After digital signal processing processes such as nonlinearity correction, digital filtering and so forth, the measurement result is displayed on the display unit 35 and sent to an upper computer through the computer interface 38.

As shown in FIG. 12, another operational amplifying circuit is used in another embodiment of the signal converting and processing circuit. Different from the embodiment shown in FIG. 11, besides the sinusoidal carrier signal, an additional square wave signal having same frequency but having a 90° phase shift is generated by the sinusoidal signal source 28. The square wave signal is then sent to the A/D converter 33. At each rising edge and falling edge of this square wave signal, the AM signal output from the main amplifier 37 is sampled by the A/D converter 33. Because the sinusoidal signal and the square wave signal come from the same signal source and are synchronized, the rising edge and falling edge of the square wave signal correspond to the wave peak and wave valley of the AM signal, thereby higher bandwidth and precision by the phase sensitive synchronizing demodulation of the AM signal can be obtained.

In the accompanying drawings:

| | |
|---|---|
| probing head | 1 |
| micro reflector | 2 |
| laser beam | 3 |
| laser source and PSD | 4 |
| spherical probing head | 5 |
| stylus pipe | 6 |
| signal conducting rod | 7 |
| active shielding pipe | 8 |
| insulating element | 9 |
| stylus holder | 10 |
| probe body | 11 |
| probe | 12 |
| signal converting and processing circuit | 13 |
| tri-coaxial cable | 14 |
| earth | 15 |
| conical locking sleeve | 16 |
| pressing pad | 17 |
| locking screw | 18 |
| slot | 19 |
| decompressing grooves | 20 |
| conductive film | 21 |
| core wire | 22 |
| insulating layer | 23 |
| inner shielding layer | 24 |
| inner sheath | 25 |
| outer shielding layer | 26 |
| outer sheath | 27 |
| sinusoidal signal source | 28 |
| reference capacitor | 29 |
| capacitance being measured | 30 |
| absolute value circuit | 31 |
| low pass filter | 32 |
| A/D converter | 33 |
| microprocessor | 34 |
| display unit | 35 |
| sensor ground | 36 |
| main amplifier | 37 |
| computer interface | 38 |

The invention claimed is:

1. A non-contact three-dimensional probing system based on a spherical capacitive plate comprising:
   a probe; and
   a signal converting and processing circuit;
   the probe comprising:
      a spherical probing head having a spherical capacitive plate over its surface so that a width of a gap between the spherical capacitive plate and a part being measured is used to generate a capacitive signal;
      a signal conducting rod which is electrically connected to the spherical capacitive plate for conducting said capacitive signal to the signal converting and processing circuit;
      an active shielding pipe surrounding the signal conducting rod, insulated against the spherical capacitive plate and driven by an equipotential driving circuit in the signal converting and processing circuit to maintain equipotential with the signal conducting rod;
      a stylus pipe surrounding the active shielding pipe, insulated against the spherical capacitive plate and earthed;
      an insulating element on one end of which the spherical probing head is fixed having a first portion between the signal conducting rod and the active shielding pipe and a second portion between the active shielding pipe and the stylus pipe;
      a stylus holder which holds the active shielding pipe; and
      a probe body which is provided for fixing the stylus holder thereon and for connecting the probe to a measuring machine;
      wherein said stylus holder comprises a locking screw, a pressing pad and a conical locking sleeve;
      wherein the conical locking sleeve is slid over the stylus pipe and fitted inside the probe body, the conical locking sleeve having a slot in its sidewall and decompressing grooves uniformly arrayed with the slot;
      wherein the locking screw is fitted inside the probe body through a screw thread; and
      wherein the pressing pad is made of elastic material and located between the conical locking sleeve and the locking screw.

2. The probing system of claim 1, wherein said spherical probing head is made by machining a ball made from conductive metal.

3. The probing system of claim 1, wherein said active shielding pipe is bell-mouthed at one end in proximity to the spherical probing head.

4. The probing system of claim 1, wherein said signal conducting rod is fitted inside the stylus pipe and is insulated against the stylus pipe by the insulating element.

5. The probing system of claim 1, wherein said spherical probing head and signal conducting rod are interconnected by welding.

6. The probing system of claim 1, wherein said signal converting and processing circuit and probe are connected via a tri-coaxial cable; and
   wherein the outer shield layer, the inner shield layer and the core wire of the tri-coaxial cable are connected to the stylus pipe, the active shielding pipe and the signal conducting rod of the probe, respectively.

7. The probing system of claim 1, wherein at least a portion of said signal converting and processing circuit is fitted inside the probe body.

8. The probing system of claim 1, wherein said signal converting and processing circuit is an operational amplifying circuit.

9. The probing system of claim 1, wherein said spherical probing head is made by machining a ball made from conductive alloy.

10. The probing system of claim 1, wherein said spherical probing head is made by coating conductive film over a dielectric sphere.

11. The probing system of claim 1, wherein said spherical probing head and signal conducting rod are interconnected by mechanical fixing.

12. The probing system of claim 1, wherein said signal converting and processing circuit is an AC bridge circuit.

* * * * *